US012791056B2

(12) United States Patent
Kobayashi et al.

(10) Patent No.: US 12,791,056 B2
(45) Date of Patent: Nov. 10, 2026

(54) RADIAL FOIL BEARING

(71) Applicant: IHI Corporation, Tokyo (JP)

(72) Inventors: Hiroki Kobayashi, Tokyo (JP); Ryuuta Tanaka, Tokyo (JP); Masahiro Nakajima, Tokyo (JP)

( * ) Notice: Subject to any disclaimer, the term of this patent is extended or adjusted under 35 U.S.C. 154(b) by 0 days.

(21) Appl. No.: 18/954,552

(22) Filed: Nov. 21, 2024

(65) Prior Publication Data

US 2025/0075733 A1 Mar. 6, 2025

Related U.S. Application Data

(63) Continuation of application No. PCT/JP2023/024634, filed on Jul. 3, 2023.

(30) Foreign Application Priority Data

Jul. 4, 2022 (JP) ................................ 2022-107845

(51) Int. Cl.
*F16C 17/02* (2006.01)

(52) U.S. Cl.
CPC ................................ *F16C 17/024* (2013.01)

(58) Field of Classification Search
CPC ................................................ F16C 17/024
See application file for complete search history.

(56) References Cited

U.S. PATENT DOCUMENTS 4,295,689 A * 10/1981 Licht ...................... F16C 27/02 384/103
8,944,686 B2 * 2/2015 Omori .................. F16C 17/024 384/103
11,306,772 B2 4/2022 Omori
2014/0169708 A1 6/2014 Omori
2015/0159689 A1 6/2015 Omori
2016/0348714 A1 12/2016 Omori
(Continued)

FOREIGN PATENT DOCUMENTS

CN 103591127 A * 2/2014 ............. F16C 43/02
CN 112943789 A * 6/2021 ........... F16C 17/024
JP S57-109322 7/1982
(Continued)

OTHER PUBLICATIONS

Translation of CN112943789 obtained Jan. 30, 2026.*
(Continued)

*Primary Examiner* — James Pilkington
(74) *Attorney, Agent, or Firm* — SHIPWAY IP

(57) ABSTRACT

A radial foil bearing surrounds a rotation axis and supports the rotation axis. The radial foil bearing includes a bearing housing, an insertion hole which is formed in the bearing housing and through which the rotation axis is inserted, a groove provided in the inner peripheral surface of the insertion hole, a through hole having an opening formed in the groove and extending to the outer peripheral surface of the bearing housing, a restricting pin that is inserted into the through hole and extends into the groove, and a top foil located in the insertion hole. The groove is formed so as to reach an axial end surface of the bearing housing. The top foil has a circumferential end part located in the groove, and the restricting pin intersects or contacts with the inner side surface of the groove at multiple locations.

7 Claims, 10 Drawing Sheets

(56) References Cited

U.S. PATENT DOCUMENTS

| | | | |
|---|---|---|---|
| 2020/0224713 | A1 | 7/2020 | Omori |
| 2020/0224714 | A1 | 7/2020 | Omori |

FOREIGN PATENT DOCUMENTS

| | | |
|---|---|---|
| JP | S61-004732 | 2/1986 |
| JP | H9-088950 | 3/1997 |
| JP | 2004-011839 | 1/2004 |
| JP | 2004-183830 | 7/2004 |
| JP | 2014-037857 | 2/2014 |
| JP | 2014-178038 | 9/2014 |
| JP | 2019-007576 | 1/2019 |
| KR | 20010001439 | 1/2001 |
| WO | 2013/018618 | 2/2013 |
| WO | 2015/125825 | 8/2015 |
| WO | 2019/004278 | 1/2019 |
| WO | 2019/049353 | 3/2019 |

OTHER PUBLICATIONS

International Search Report dated Sep. 12, 2023 for PCT/JP2023/024634.

International Preliminary Report on Patentability with Written Opinion dated Jan. 16, 2025 4 for PCT/JP2023/024634.

* cited by examiner

RADIAL FOIL BEARING

CROSS-REFERENCE TO RELATED APPLICATIONS

This application is a continuation application of PCT Application No. PCT/JP2023/024634, filed on Jul. 3, 2023, which claims the benefit of priority from Japanese Patent Application No. 2022-107845, filed on Jul. 4, 2022. The entire contents of the above listed PCT and priority applications are incorporated herein by reference.

BACKGROUND

Field

The present disclosure relates to a radial foil bearing.

Description of the Related Art

International Publication No. WO 2019/049353 discloses a radial foil bearing. In this radial foil bearing, an insertion hole through which a rotation axis is inserted is provided in a bearing case, and a ring foil is installed in a gap between an outer peripheral surface of the rotation axis and an inner peripheral surface of the insertion hole. A plurality of protrusions protruding to the axially outer side is provided on the outer peripheral surface of the ring foil, and a plurality of grooves into which the protrusions are fitted is provided on the inner peripheral surface of the insertion hole. A through hole penetrating to the outer peripheral surface of the bearing case is provided in the groove, a stopper pin is inserted through the through hole, and the stopper pin is engaged with a notch formed in the protrusion to fix the ring foil to the bearing case.

SUMMARY

Disclosed herein is an example radial foil bearing surrounds a rotation axis and supports the rotation axis. The radial foil bearing includes a bearing housing, an insertion hole formed in the bearing housing and through which the rotation axis is inserted, a groove provided in the inner peripheral surface of the insertion hole, a through hole having an opening formed in the groove and extending to the outer peripheral surface of the bearing housing, a restricting pin inserted into the through hole and also extending into the groove, and a top foil disposed in the insertion hole, in which the groove is formed so as to reach an axial end surface of the bearing housing, a circumferential end part of the top foil is disposed in the groove. The restricting pin intersects or contacts with the inner side surface of the groove at multiple locations.

DETAILED DESCRIPTION

Figure 1:
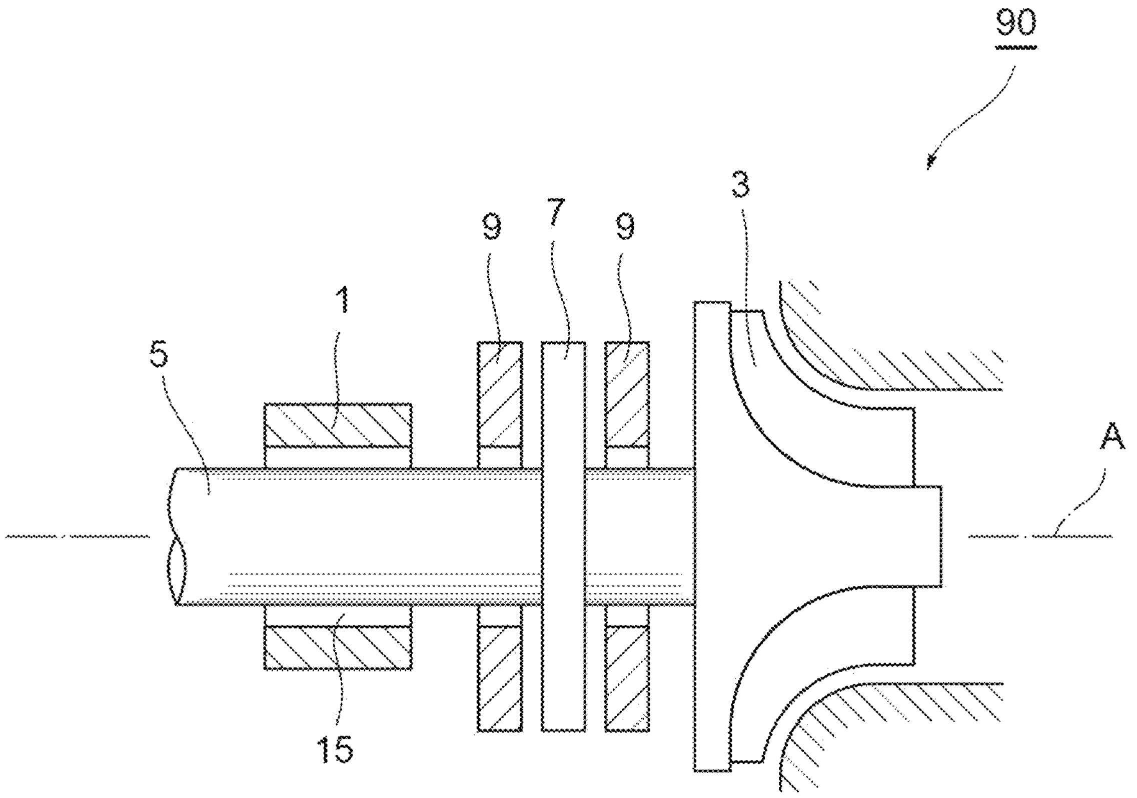
FIG. 1 is a side view illustrating a part of a rotating machine to which an example radial foil bearing is applied.

An example radial foil bearing surrounds a rotation axis and supports the rotation axis. The radial foil bearing including a bearing housing, an insertion hole formed in the bearing housing and through which the rotation axis is inserted, a groove provided in the inner peripheral surface of the insertion hole, a through hole having an opening formed in the groove and extending to the outer peripheral surface of the bearing housing, a restricting pin inserted into the through hole and also extending into the groove, and a top foil disposed in the insertion hole, in which the groove is formed so as to reach an axial end surface of the bearing housing. A circumferential end part of the top foil is disposed in the groove, and the restricting pin intersects or contacts with the inner side surface of the groove at multiple locations.

A pair of the restricting pins may be disposed so as to sandwich the end part of the top foil in an extending direction of the groove. In addition, the restricting pin may pass through a hole provided at the end part of the top foil in the groove, and the top foil may be installed in a state that allows for a displacement corresponding to a dimensional difference between the restricting pin and the hole.

The restricting pin may penetrate the end part of the top foil in the groove. One end of the restricting pin may be screwed into a female screw hole provided in the inner side surface of the groove. The restricting pin may pass through the groove and extend so that both ends thereof protrude to outside of the bearing housing, and the both ends of the restricting pin may be provided with come-off prevention portions that restrict displacement of come-off direction from the bearing housing. The restricting pin and the end part of the top foil may overlap when viewed in the extending direction of the groove.

In the following description, with reference to the drawings, the same reference numbers are assigned to the same components or to similar components having the same function, and overlapping description is omitted. In the drawings, the features of the parts may be exaggeratedly illustrated, and the dimensional ratios of the parts in the drawings do not necessarily coincide with the actual parts, and do not necessarily coincide with each other in the drawings.

FIG. 1 is a side view illustrating a part of a rotating machine 90 to which a radial foil bearing 1 of the first embodiment is applied. The radial foil bearing 1 is used as a radial bearing of a rotation axis 5 of an impeller 3 of the rotating machine 90. Examples of such a rotating machine 90 include a turbine, a compressor, a supercharger, and the like. Note that, the radial foil bearing 1 of the first embodiment is not limited to a bearing of an impeller rotation axis, and can also be used as a bearing of a rotation axis of an electric motor, a generator or the like. In the description of the radial foil bearing 1, the terms "axial direction", "radial direction", and "circumferential direction" simply mean the axial direction, the radial direction, and the circumferential direction of the rotation axis 5 in a use state in the rotating machine 90.

The rotating machine 90 includes the rotation axis 5 that rotates about a rotation axis line A and the impeller 3 provided at the tip of the rotation axis 5. A thrust collar 7 is provided on the rotation axis 5, and a pair of thrust bearings 9 and 9 are provided on the casing side of the rotating machine 90 so as to sandwich the thrust collar 7 in the axial direction Sd. The radial foil bearing 1 is disposed at a position farther from the impeller 3 than the thrust bearings 9 and 9. The radial foil bearing 1 is attached to the casing side of the rotating machine 90 so as to surround the rotation axis 5, and supports the rotation axis 5.

Figure 2B:
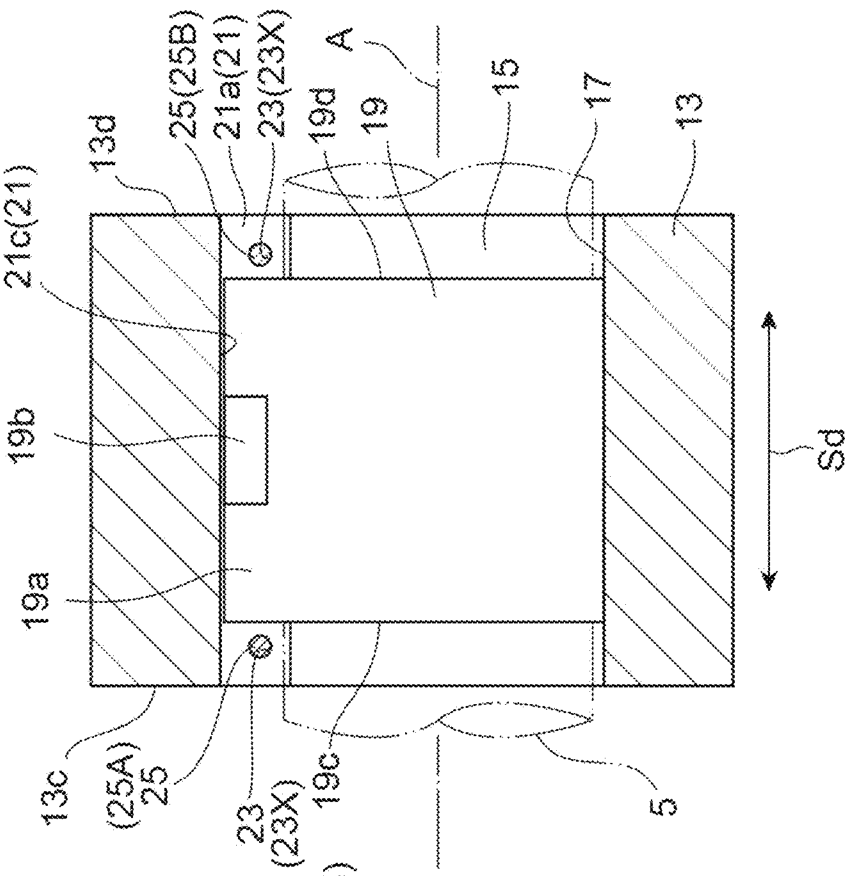
FIG. 2B is a partially broken side view illustrating the radial foil bearing illustrated in FIG. 2A.
Figure 2A:
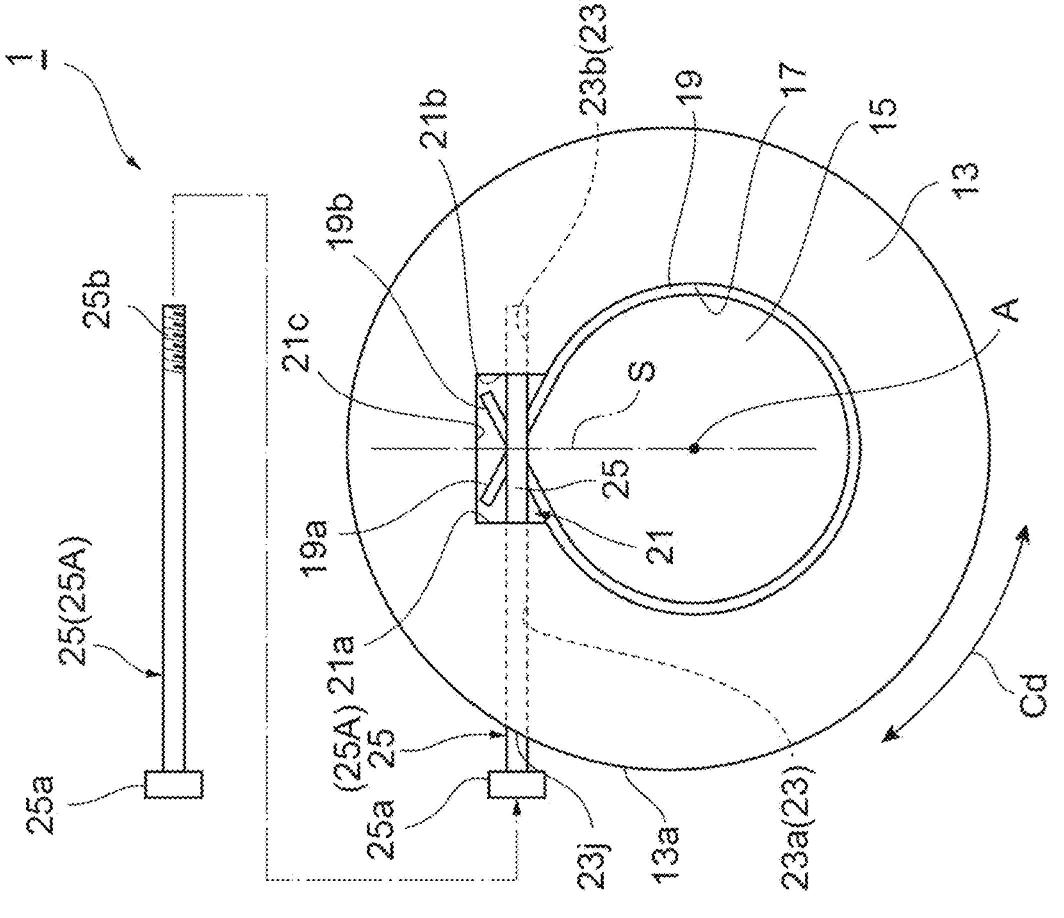
FIG. 2A is a front view illustrating an example radial foil bearing as viewed from the axial direction.

FIG. 2A is a front view illustrating the radial foil bearing 1 as viewed from the axial direction Sd, and FIG. 2B is a partially broken side view illustrating a bearing housing 13 or the like of the radial foil bearing 1 in a partially broken manner. As illustrated in the drawing, the radial foil bearing 1 includes the bearing housing 13 having a circular shape. Note that, it is not essential that the bearing housing 13 has a circular shape. An insertion hole 15 through which the rotation axis 5 is inserted is formed in a central portion of the bearing housing 13. The insertion hole 15 has a circular shape centered on the rotation axis line A as viewed from the axial direction Sd, and penetrates the bearing housing 13 in the axial direction Sd. The radial foil bearing 1 also includes a bearing foil 19. The bearing foil 19 is disposed along an inner peripheral surface 17 of the insertion hole 15. In a gap between the outer peripheral surface of the rotation axis 5 inserted into the insertion hole 15 and the inner peripheral surface 17 of the insertion hole 15, the bearing foil 19 extends in the circumferential direction Cd over substantially the entire circumference.

Figure 3:
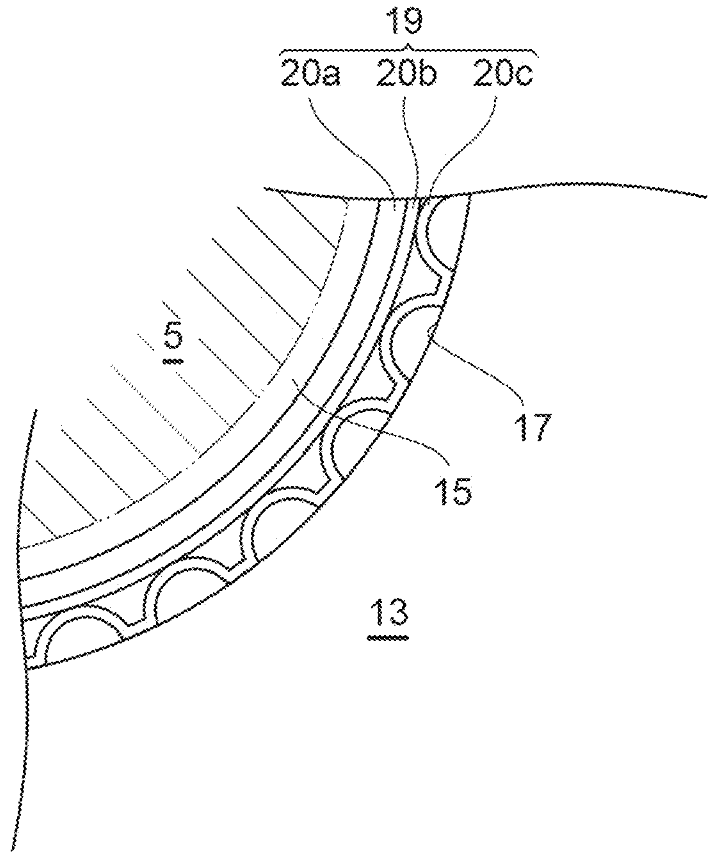
FIG. 3 is an enlarged front view illustrating an example bearing foil.
Figure 4A:
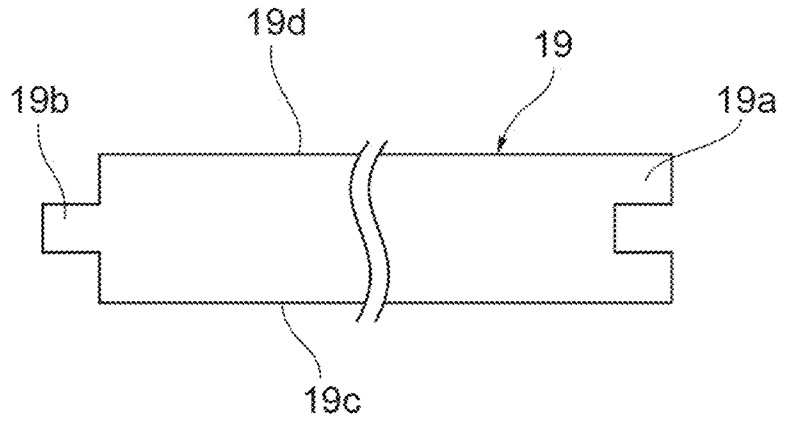
FIG. 4A is a development view illustrating a state where an example bearing foil is developed on a plane.
Figure 4B:
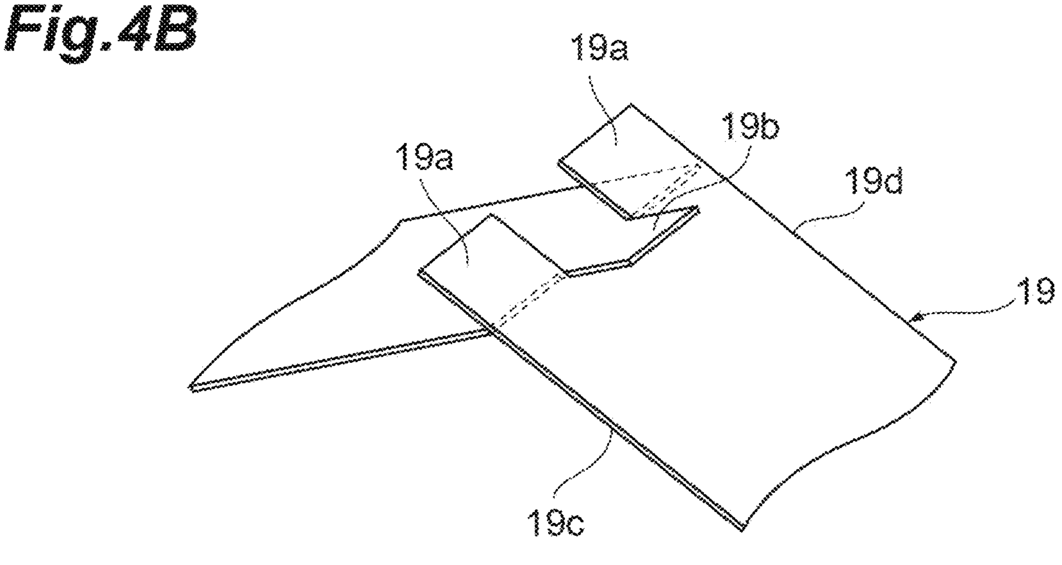
FIG. 4B is a perspective view illustrating both end parts of the bearing foil illustrated in FIG. 4A.

FIG. 3 is an enlarged front view illustrating the inner peripheral surface 17 of the insertion hole 15 and the bearing foil 19 on the inner peripheral surface 17. FIG. 4A is a development view illustrating a state where the bearing foil 19 is developed on a plane, and FIG. 4B is a perspective view illustrating both end parts 19*a* and 19*b* of the bearing foil 19. As illustrated in FIG. 3, the bearing foil 19 includes a top foil 20*a*, an intermediate foil 20*b*, and a back foil 20*c* that are stacked in order from the inner peripheral side. The top foil 20*a* is a tabular metal thin plate facing the outer peripheral surface of the rotation axis 5 with a slight gap, and forms a fluid film that supports the rotation axis 5 by drawing a fluid into the gap. The back foil 20*c* is a corrugated metal thin plate, and elastically supports the intermediate foil 20*b* and the top foil 20*a* by a so-called bump foil structure. The intermediate foil 20*b* is a tabular metal thin plate disposed between the top foil 20*a* and the back foil 20*c*.

In FIG. 2A, in order to avoid complication of the drawing, the bearing foil 19 is illustrated as a single metal thin plate, but in practice, the three foils 20*a*, 20*b*, and 20*c* as described above have the same plane development shape illustrated in FIG. 4A and are overlapped with each other in the thickness direction, thereby forming the bearing foil 19. The bearing foil 19 illustrated in FIG. 4A is formed by overlapping three foils 20*a*, 20*b*, and 20*c* (FIG. 3) having the same plane development shape in the depth direction of the paper surface. In the drawings after FIG. 4, in order to avoid complication of the drawings, the bearing foil 19 is illustrated as a single metal thin plate similarly to FIG. 2A. The bearing foil 19 may be an integrated object like a single metal thin plate.

As illustrated in FIG. 4A, the bearing foil 19 has a strip shape in a plane developed state. One circumferential end part 19*b* (e.g., convex end part) of the bearing foil 19 is formed in a convex shape, and the other end part 19*a* (e.g., concave end part) is formed in a concave shape corresponding to the convex shape. The strip-shaped bearing foil 19 is rolled into a cylindrical shape around the rotation axis line A so as to match the both end parts 19*a* and 19*b*, and is installed in the insertion hole 15. As a result, the bearing foil 19 extends along the inner peripheral surface 17 of the insertion hole 15 with a repulsive force due to deformation into the cylindrical shape. In addition, at this time, as illustrated in FIG. 4B, the concave and the convex of the both end parts 19*a* and 19*b* of the bearing foil 19 engage with each other, so that the both end parts 19*a* and 19*b* intersect with each other in an X shape when viewed in the axial direction Sd as illustrated in FIG. 2A.

A groove 21 recessed toward the radially outer side is formed in the inner peripheral surface 17 of the insertion hole 15. The groove 21 is a bottomed rectangular groove having a depth in the radial direction and extending in the axial direction Sd, and extends over the entire length in the axial direction Sd of the insertion hole 15. The groove 21 reaches both axial end surfaces 13*c* and 13*d* of the bearing housing 13, and the cross section of the groove 21 appears on the both axial end surfaces 13*c* and 13*d* of the bearing housing 13. The groove 21 has three inner side surfaces. One of the inner side surfaces is a groove bottom surface 21*c* orthogonal to the radial direction, and the other two are groove side surfaces 21*a* and 21*b* orthogonal to the groove bottom surface 21*c* and parallel to the rotation axis line A. The both end parts 19*a* and 19*b* of the bearing foil 19 locally return to be tabular with a repulsive force due to deformation of being rounded into a cylindrical shape, and are inserted into the groove 21 in a state of intersecting in an X shape as described above. Note that, the groove 21 of the first embodiment is recessed in a rectangular shape roughly parallel to the radial direction, but this is merely an example. For example, the groove 21 may be a groove that is inclined so as to contain a circumferential component together with a radial component and is recessed toward the outer diameter side, or the cross-sectional shape may not be necessarily rectangular, and for example, a smaller recess may be formed in a rectangular inner wall. In addition, the groove 21 of the first embodiment is parallel to the axial direction Sd. However, the groove 21 does not necessarily extend parallel to the axial direction Sd, and may be inclined and extend so as to contain a circumferential component together with an axial component, for example.

A mechanism for restricting the axial displacement of the bearing foil 19 installed in the insertion hole 15 as described above will be described. The bearing housing 13 is provided with multiple pin holes 23 (e.g., a first through hole 23 and a second through hole 23), and multiple restricting pins 25 (e.g., a first restricting pin 25A and a second restricting pin 25B) are inserted into the pin holes 23, respectively. As illustrated in FIG. 2B, the pin holes 23 and 23 are arranged one by one at both end parts in the axial direction Sd of the bearing housing 13, and both end parts 19*a* and 19*b* of the bearing foil 19 are located so as to be axially sandwiched between the pin holes 23 and 23.

A pin insertion port 23*j* of the pin hole 23 is opened in an outer peripheral surface 13*a* of the bearing housing 13, and the pin hole 23 is formed to linearly extend from the outer peripheral surface 13*a* through the groove 21. Assuming that a virtual plane including the rotation axis line A and passing through the circumferential center of the groove 21 is a "virtual plane S", the pin hole 23 extends in a direction orthogonal to the virtual plane S and vertically penetrates the groove side surface 21*a* and the groove side surface 21*b* on the way. The pin hole 23 extends in a direction intersecting with the virtual plane including the rotation axis line A and passing through the groove 21, and intersects the inner side surface of the groove 21 at two intermediate locations.

Hereinafter, a part of the pin hole 23 closer to the pin insertion port 23*j* than the groove side surface 21*a* is referred to as a "pin hole base end side 23*a*", and a part of the pin hole 23 closer to the tip than the groove side surface 21*b* is referred to as a "pin hole tip side 23*b*". The pin hole base end side 23*a* is a through hole that opens into the groove 21 on the groove side surface 21*a* and extends to the outer peripheral surface 13*a* of the bearing housing 13. In addition, the pin hole tip side 23*b* is a bottomed hole that opens into the groove 21 on the groove side surface 21*b*. In addition, the pin hole base end side 23*a* is a through hole, whereas the pin hole tip side 23*b* is a tap hole that is internally threaded. It can also be said that the pin hole tip side 23*b* is a female screw hole provided in the groove side surface 21*b* in the groove 21. Each of the pin hole base end side 23*a* and the pin hole tip side 23*b* has an opening 23*x* in the groove 21.

The restricting pin 25 is a rod-shaped metal member linearly extending with a diameter that can be inserted into the pin hole 23. A male screw portion 25*b* that can be screwed into a female screw portion on the pin hole tip side 23*b* is formed at least on the tip side of the restricting pin 25. Note that, the male screw portion 25*b* may be formed over the entire length of the restricting pin 25. In addition, a head portion 25*a* for hooking a tool is formed on the base end side of the restricting pin 25, and using the tool, the restricting pin 25 can be rotated around the own axis. A bolt may be employed as the restricting pin 25. When the radial foil bearing 1 is assembled, the tip side of the restricting pin 25 is inserted into the pin hole 23 from the pin insertion port 23*j*, and the tip of the restricting pin 25 passes through the groove 21 and reaches the pin hole tip side 23*b* formed in the groove side surface 21*b*. Then, the head portion 25*a* is turned by the tool outside the bearing housing 13, the male screw portion 25*b* of the restricting pin 25 is screwed into the pin hole tip side 23*b*. The tip part of the restricting pin 25 is screwed into the pin hole tip side 23*b* in this manner, so that the restricting pin 25 is fixed to the bearing housing 13 so as not to come off from the bearing housing 13. Note that, the presence of the head portion 25*a* is an example and is not essential.

It can be said that the restricting pin 25 installed in this manner intersects with the inner side surfaces 21*a* to 21*c* of the groove 21 at multiple locations when viewed in the axial direction Sd. The first restricting pin 25A may pass through the groove side surface 21*a* and the groove side surface 21*b*. The second restricting pin 25B may pass through the groove side surface 21*c* and the groove side surface 21*a*. In addition, when viewed in the extending direction (axial direction Sd) of the groove 21 as illustrated in FIG. 2A, the restricting pin 25 overlaps both end parts 19*a* and 19*b* of the bearing foil 19 in the groove 21. Assuming that a virtual plane including the rotation axis line A and passing through the circumferential center of the groove 21 is a "virtual plane S", it can be said that the restricting pin 25 extends in a direction intersecting with the virtual plane S and passes through the groove 21. The restricting pin 25 may extend in a direction orthogonal to the virtual plane S. In addition, when viewed in the extending direction of the restricting pin 25 as illustrated in FIG. 2B, the two restricting pins 25 and 25 are located outside both axial end parts 19*c* and 19*d* of the bearing foil 19, respectively.

As described above, the two restricting pins 25 and 25 are located so as to sandwich the both end parts 19*a* and 19*b* in the axial direction Sd, and when viewed in the extending direction (axial direction Sd) of the groove 21, the restricting pin 25 overlaps the both end parts 19*a* and 19*b* of the bearing foil 19 in the groove 21. The both end parts 19*a* and 19*b* are located between the first restricting pin 25A and the second restricting pin 25B. With this arrangement, when the bearing foil 19 attempts to be displaced in the axial direction Sd in the insertion hole 15, the both end parts 19*a* and 19*b* interfere with the restricting pin 25 and the displacement is prevented. The axial displacement of the bearing foil 19 in the insertion hole 15 is restricted by the presence of the restricting pin 25. Note that, a part of the top foil 20*a* accommodated in the groove 21 is included in the both end parts 19*a* and 19*b* accommodated in the groove 21, and the both end parts 19*a* and 19*b* extend to the radially outer side from the restricting pin 25. When viewed in the axial direction Sd, a part of the top foil 20*a* protrudes to the radially outer side from the restricting pin 25 in the groove 21.

In some examples, the effect of frictional damping may be achieved by a relatively slight axial displacement of the restricting pin 25. Spacing between the two restricting pins 25 may be slightly wider than the axial width of the part of the top foil 20*a* accommodated in the groove 21. Alternatively, the top foil 20*a* may be accommodated in the groove 21 so as to be separated from at least one of the two restricting pins 25.

In addition, in the first embodiment, the part of the top foil 20*a* accommodated in the groove 21 is not fixed to the groove 21. Therefore, the part of the top foil 20*a* accommodated in the groove 21 can be displaced or deformed in the groove 21, which contributes to improvement of damping performance of the radial foil bearing 1.

In the radial foil bearing 1 configured as described above, a regulating portion of axial displacement of the bearing foil 19 including the top foil 20*a*, the intermediate foil 20*b*, and the back foil 20*c* is realized by component parts such as the two restricting pins 25 and 25. In addition, the regulating portion of axial displacement of the bearing foil 19 is assembled by a relatively simple procedure in which the restricting pins 25 and 25 are inserted from the outside of the bearing housing 13 toward a direction intersecting with the above-described virtual plane S in the groove 21 and installed, after the strip-shaped bearing foil 19 is rounded and installed in the insertion hole 15. Thus, according to the configuration of the radial foil bearing 1, the radial foil bearing can be easily assembled.

Hereinafter, second to eighth embodiments of the radial foil bearing will be described. The radial foil bearings of the following second to eighth embodiments can also provide the similar operational effects as those of the above-described first embodiment. In the following description of each embodiment, differences from other embodiments including the first embodiment will be mainly described.

Figure 5A:
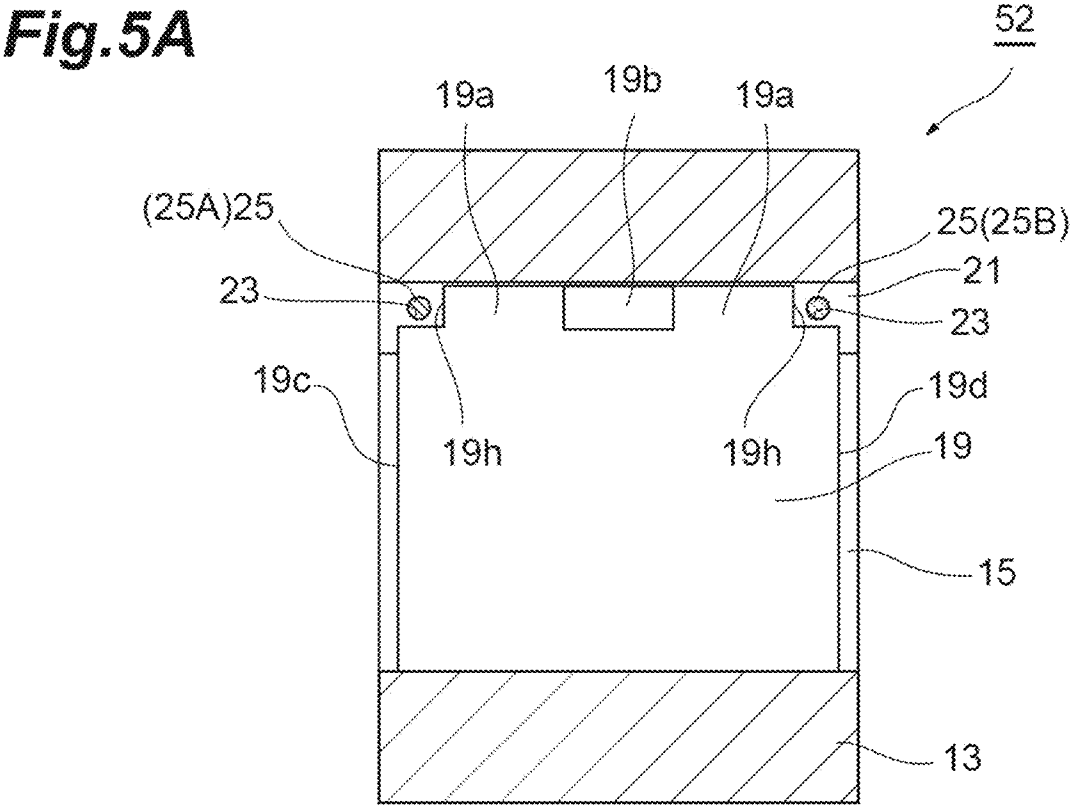
FIG. 5A is a side view of an example radial foil bearing.
Figure 5B:
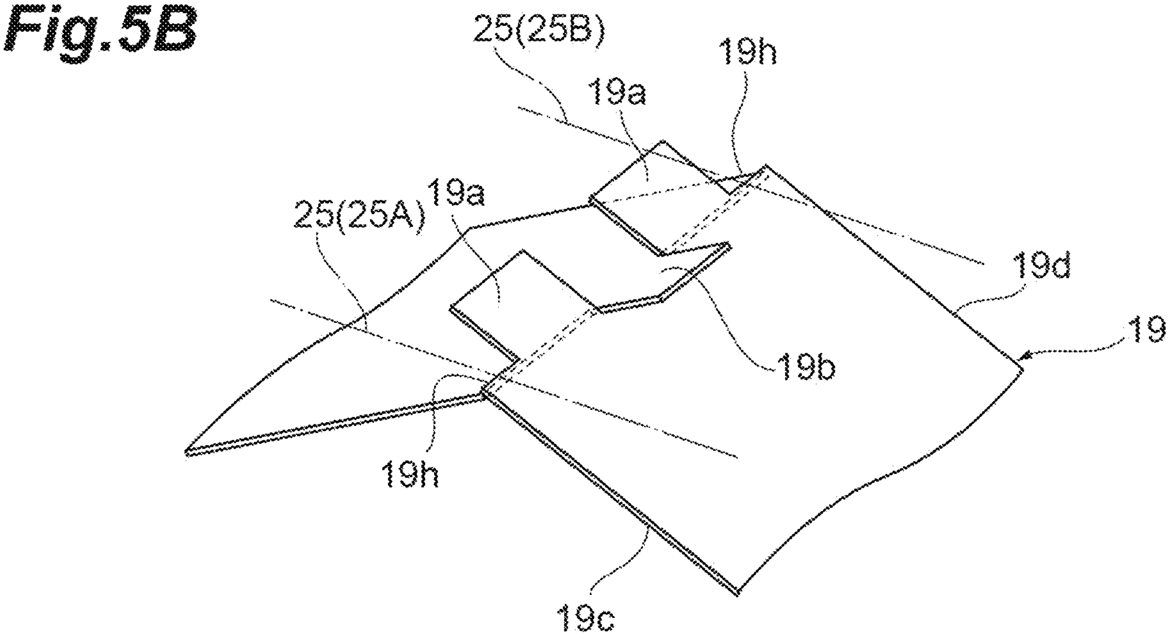
FIG. 5B is a perspective view illustrating both end parts of the bearing foil illustrated in FIG. 5A.

FIG. 5A is a side view of a radial foil bearing 52 according to a second embodiment. The first embodiment and the present embodiment are different in that, the two restricting pins 25 and 25 are located outside the both axial end parts 19_c_ and 19_d_ of the bearing foil 19, respectively in the radial foil bearing 1 according to the first embodiment, whereas the two restricting pins 25 and 25 are located inside the both axial end parts 19_c_ and 19_d_ of the bearing foil 19, respectively in the radial foil bearing 52 according to the present embodiment. In order to enable such a positional relationship, as illustrated in FIG. 5B, the circumferential end parts 19_a_ of the bearing foil 19 are formed with rectangular notches 19_h_ and 19_h_ at corner positions intersecting with the axial end parts 19_c_ and 19_d_, respectively. Then, as indicated by a dashed-dot line in the drawing, the restricting pins 25 and 25 pass through the notches 19_h_ and 19_h_. The bearing foil 19 avoids interference with the restricting pins 25 and 25 by the notches 19_h_ and 19_h_ in this manner, so that the axial end parts 19_c_ and 19_d_ of the bearing foil 19 protrude outward from the restricting pins 25 and 25.

Figure 6A:
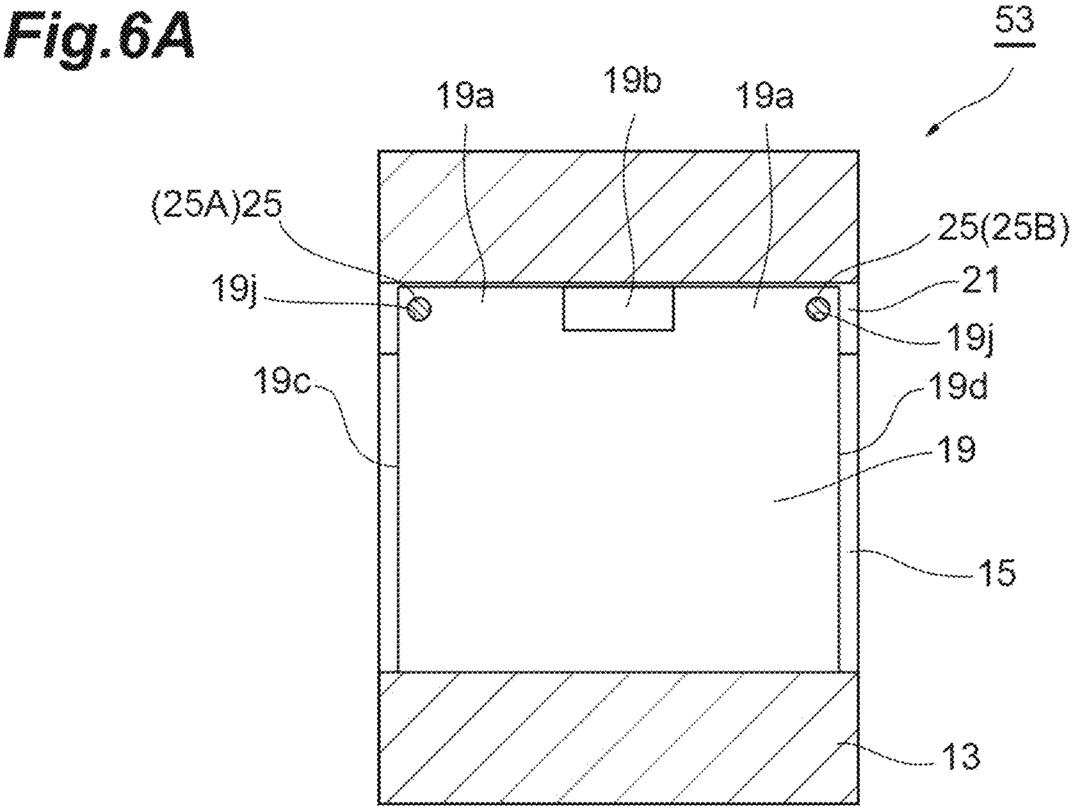
FIG. 6A is a side view of an example radial foil bearing.
Figure 6B:
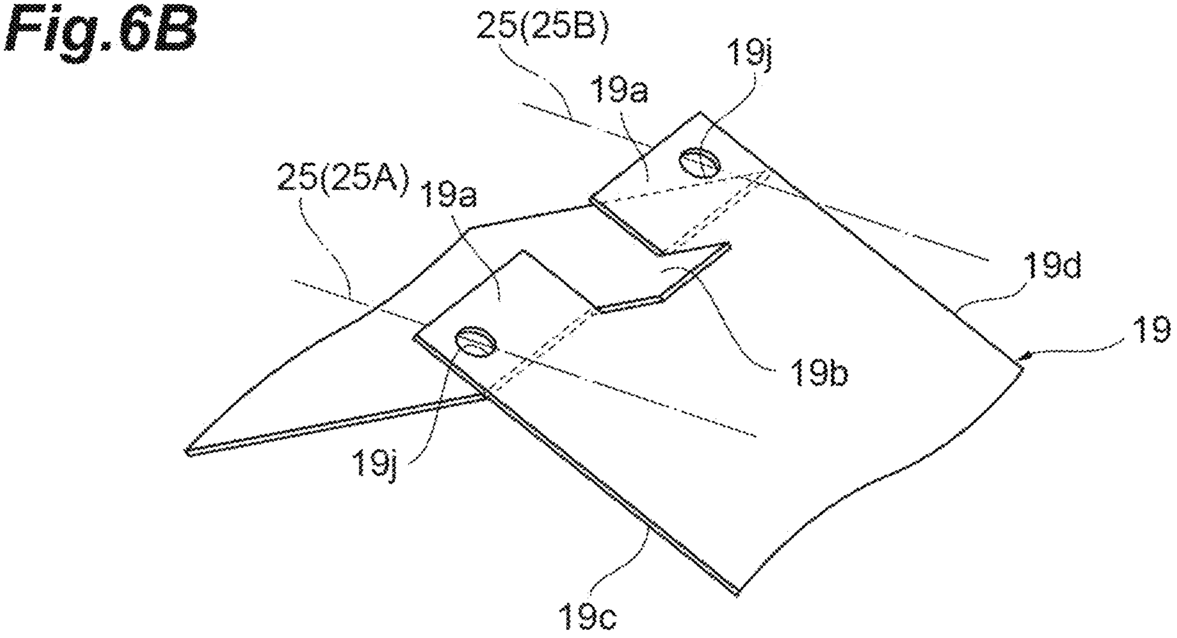
FIG. 6B is a perspective view illustrating both end parts of the bearing foil illustrated in FIG. 6A.

As illustrated in FIGS. 6A and 6B, in a radial foil bearing 53 according to a third embodiment, instead of the notches 19_h_ and 19_h_ in the second embodiment, holes 19_j_ (e.g., a first hole) and 19_j_ (a second hole) are each formed in the circumferential end part 19_a_ of the bearing foil 19, and as indicated by dashed lines in the drawing, the restricting pins 25 and 25 pass through the holes 19_j_ and 19_j_.

When viewed from the extending direction of the restricting pin 25, the diameter of the hole 19_j_ is slightly larger than the diameter of the restricting pin 25, and there is a slight gap between the inner edge of the hole 19_j_ and the outer peripheral surface of the restricting pin 25. Thus, axial, radial, and circumferential displacement of the bearing foil 19 is not completely prevented by the restricting pin 25. The bearing foil 19 may be installed in a state that allows for a displacement corresponding to a dimensional difference between the restricting pin 25 and the hole 19_j_. The part of the top foil 20_a_ accommodated in the groove 21 may not be fixed to the groove 21. The part of the top foil 20_a_ accommodated in the groove 21 may be displaced or deformed in the groove 21.

Figure 7A:
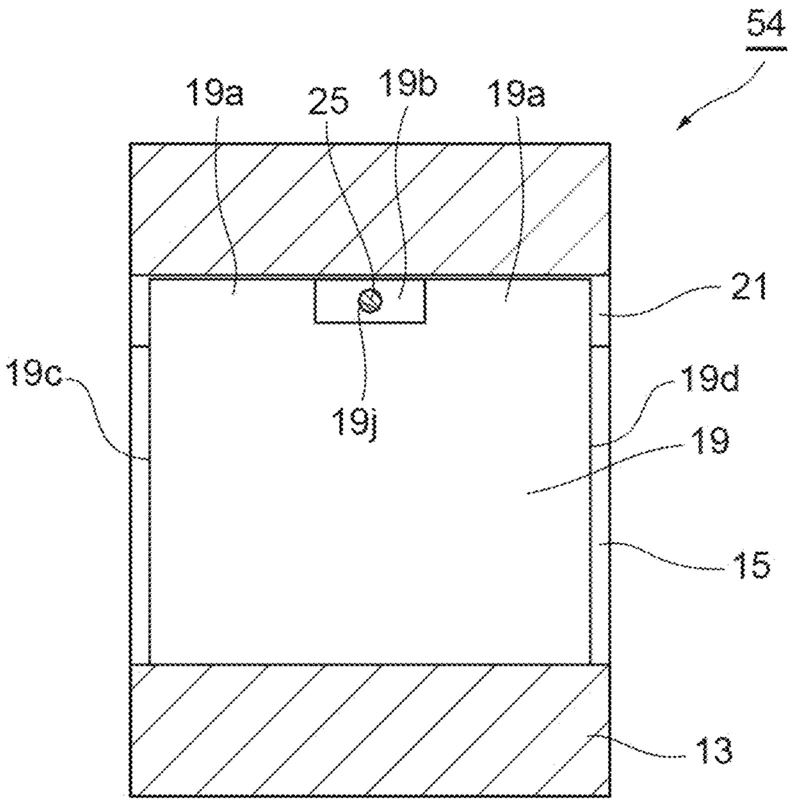
FIG. 7A is a side view of an example radial foil bearing.
Figure 7B:
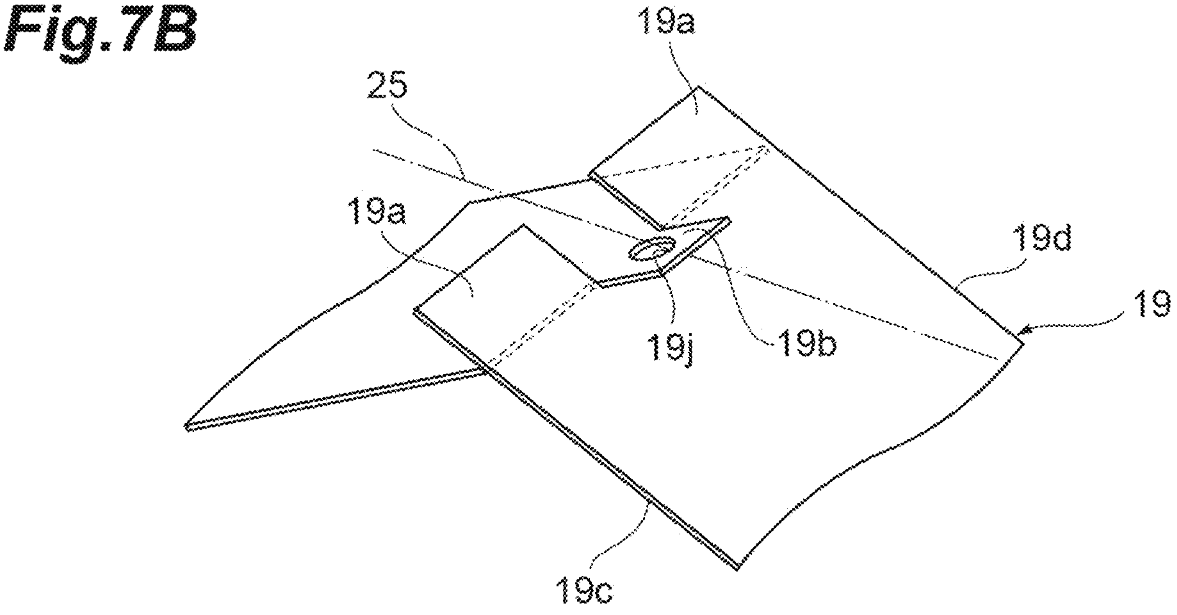
FIG. 7B is a perspective view illustrating both end parts of the bearing foil illustrated in FIG. 7A.

As illustrated in FIGS. 7A and 7B, in a radial foil bearing 54 according to a fourth embodiment, the two restricting pins 25 and 25 in the third embodiment are reduced to one and moved to the axial center portion of the bearing housing 13. Correspondingly, the hole 19_j_ is similarly moved to the axial center portion of the bearing foil 19, and the restricting pin 25 passes through the hole 19_j_.

Also in the present embodiment, similarly to the above-described third embodiment, the bearing foil 19 is installed in a state that allows for a displacement corresponding to a dimensional difference between the restricting pin 25 and the hole 19_j_.

Figure 8A:
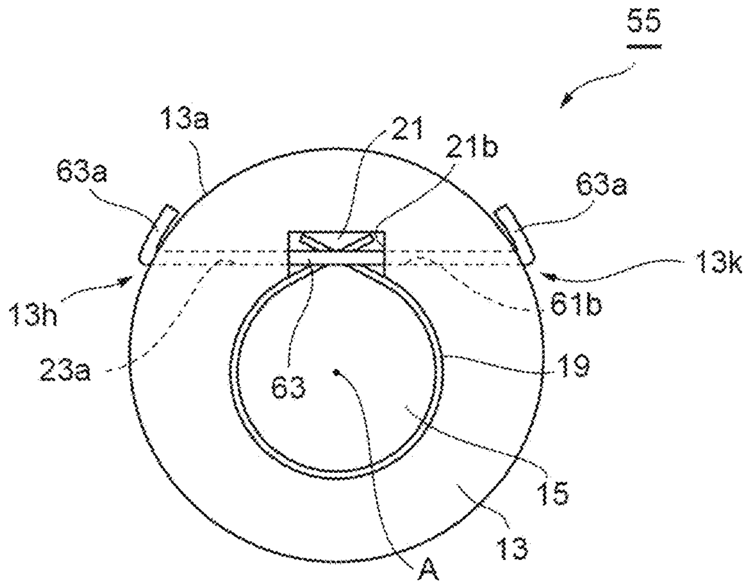
FIG. 8A is a front view illustrating an example radial foil bearing as viewed from the axial direction.

As illustrated in FIG. 8A, a radial foil bearing 55 according to a fifth embodiment includes a pin hole tip side 61_b_ instead of the pin hole tip side 23_b_ which is a bottomed tap hole in the first embodiment. The pin hole tip side 61_b_ is a through hole that opens into the groove 21 on the groove side surface 21_b_ and extends to the outer peripheral surface 13_a_ of the bearing housing 13. Correspondingly, a restricting pin 63 extends so that both end parts each protrude from one location 13_h_ and the other location 13_k_ on the outer peripheral surface 13_a_ of the bearing housing 13. Then, after the restricting pin 63 is inserted into the pin hole base end side 23_a_ and the pin hole tip side 61_b_, both end parts of the restricting pin 63 are bent slightly outside the outer peripheral surface 13_a_ to form bent portions 63_a_ and 63_a_. The bent portions 63_a_ and 63_a_ function as come-off prevention for preventing the restricting pin 63 from coming off. The bent portion 63_a_ may be an example of retention portion.

Figure 8B:
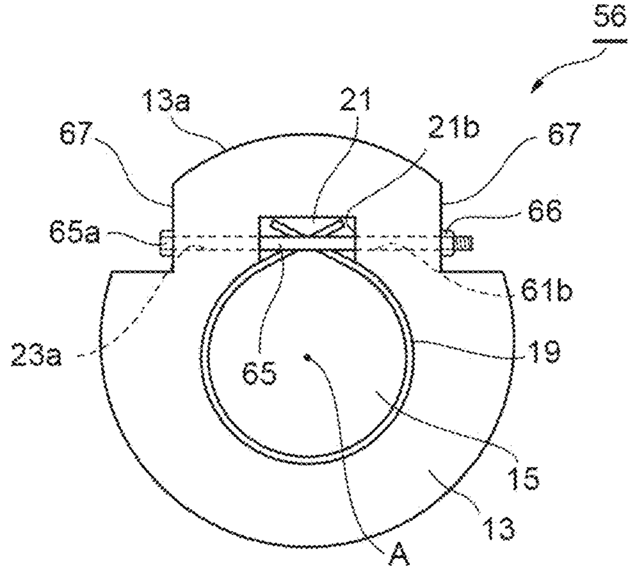
FIG. 8B is a front view illustrating an example radial foil bearing as viewed from the axial direction.

As illustrated in FIG. 8B, a radial foil bearing 56 according to a sixth embodiment includes a bolt 65 functioning as a restricting pin instead of the restricting pin 63 in the fifth embodiment. Then, instead of the bent portions 63_a_ and 63_a_, a nut 66 is screwed into the tip part of the bolt 65 outside the outer peripheral surface 13_a_. In addition, on the outer peripheral surface 13_a_, bearing surfaces 67 to which a head 65_a_ of the bolt 65 and the nut 66 are each fixed are provided. Such fastening of the bolt 65 and the nut 66 realizes come-off prevention of the bolt 65 serving as a restricting pin. The head 65_a_ of the bolt 65 and the nut 66 function as come-off prevention portions that restrict displacement of the bolt 65 in the come-off direction. The bolt 65 and the nut 66 may be examples of retention portion.

Figure 8C:
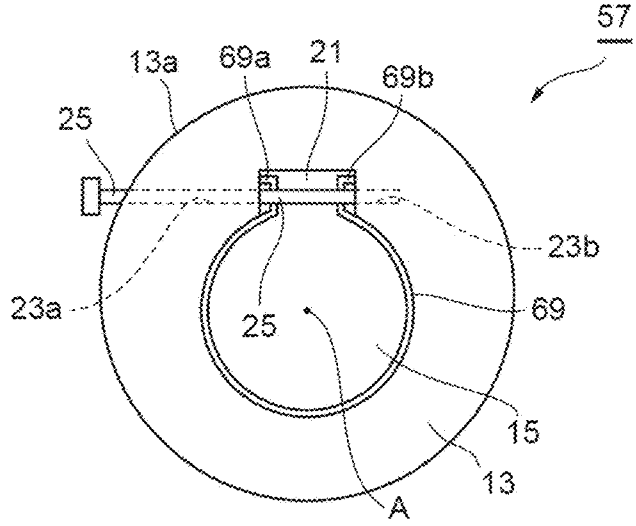
FIG. 8C is a front view illustrating an example radial foil bearing as viewed from the axial direction.

As illustrated in FIG. 8C, a radial foil bearing 57 according to a seventh embodiment includes a bearing foil 69 instead of the bearing foil 19 in the first embodiment. The end parts 19_a_ and 19_b_ of the bearing foil 19 engage and intersect with each other in the groove 21, whereas circumferential end parts 69_a_ and 69_b_ of the bearing foil 69 are bent toward the radially outer side in the groove 21 and do not intersect with each other when viewed in the axial direction Sd.

Figure 9A:
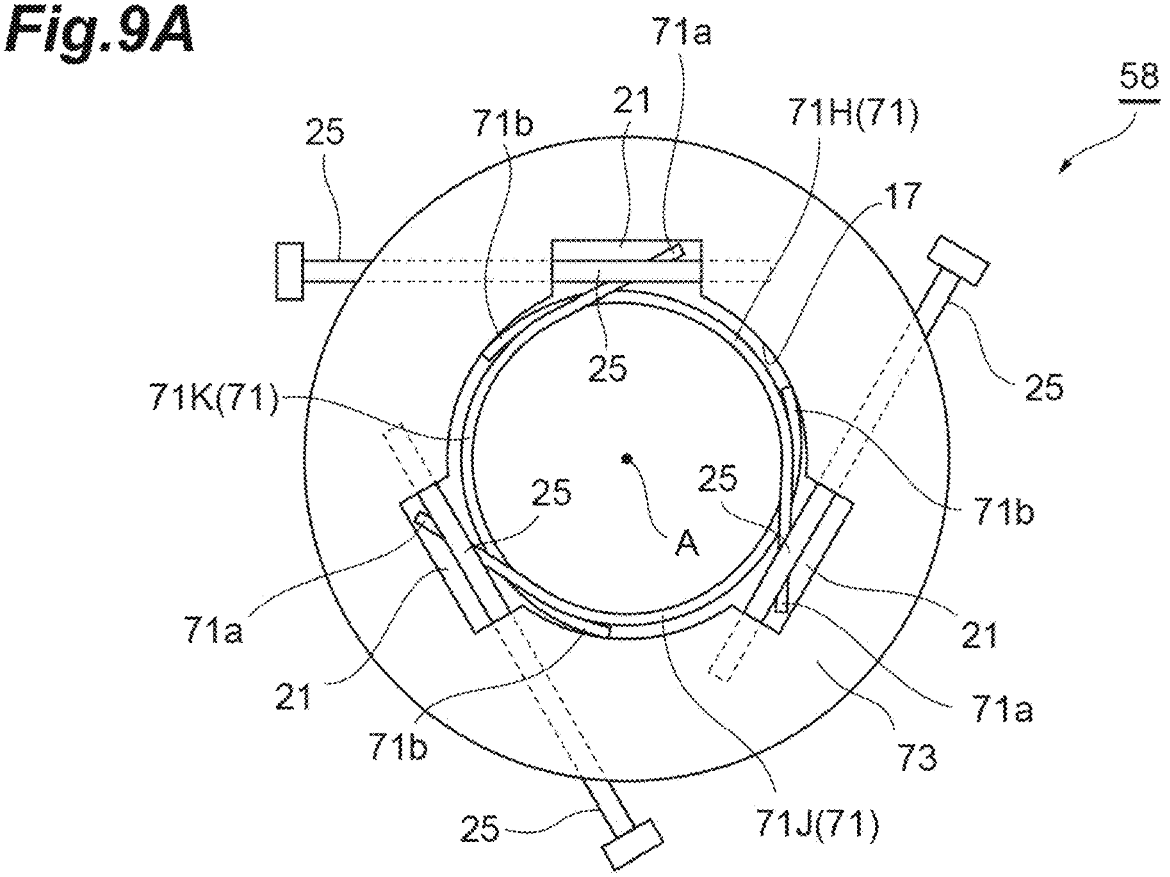
FIG. 9A is a front view illustrating an example radial foil bearing as viewed from the axial direction.

As illustrated in FIG. 9A, a radial foil bearing 58 according to an eighth embodiment includes a bearing foil 71 instead of the bearing foil 19. The bearing foil 71 includes three bearing foils 71H, 71J, and 71K having substantially equal circumferential dimensions and connected in the circumferential direction Cd, and surrounds the rotation axis 5 (see FIG. 1). The circumferential connection structure among the bearing foils 71H, 71J, and 71K is similar to, for example, the connection structure by concave and convex engagement between the end parts 19_a_ and 19_b_ as illustrated in FIG. 4B. Each of the bearing foils 71H, 71J, and 71K includes the top foil 20_a_, the intermediate foil 20_b_, and the back foil 20_c_, similarly to the bearing foil 19 (see FIG. 3). In a bearing housing 73, three grooves 21 are formed at equal intervals in the circumferential direction Cd. One circumferential end part 71_a_ of each of the bearing foils 71H, 71J, and 71K is inserted into the groove 21, and the other circumferential end part 71_b_ is located on the inner peripheral surface 17 of the insertion hole 15 without being inserted into the groove 21. Then, the circumferential end part 71_a_ inserted into the groove 21 is axially sandwiched between the two restricting pins 25 arranged in the depth direction of the drawing. When viewed in the extending direction (axial direction Sd) of the groove 21, the restricting pin 25 and the circumferential end part 71_a_ overlap each other in the groove 21.

Figure 9B:
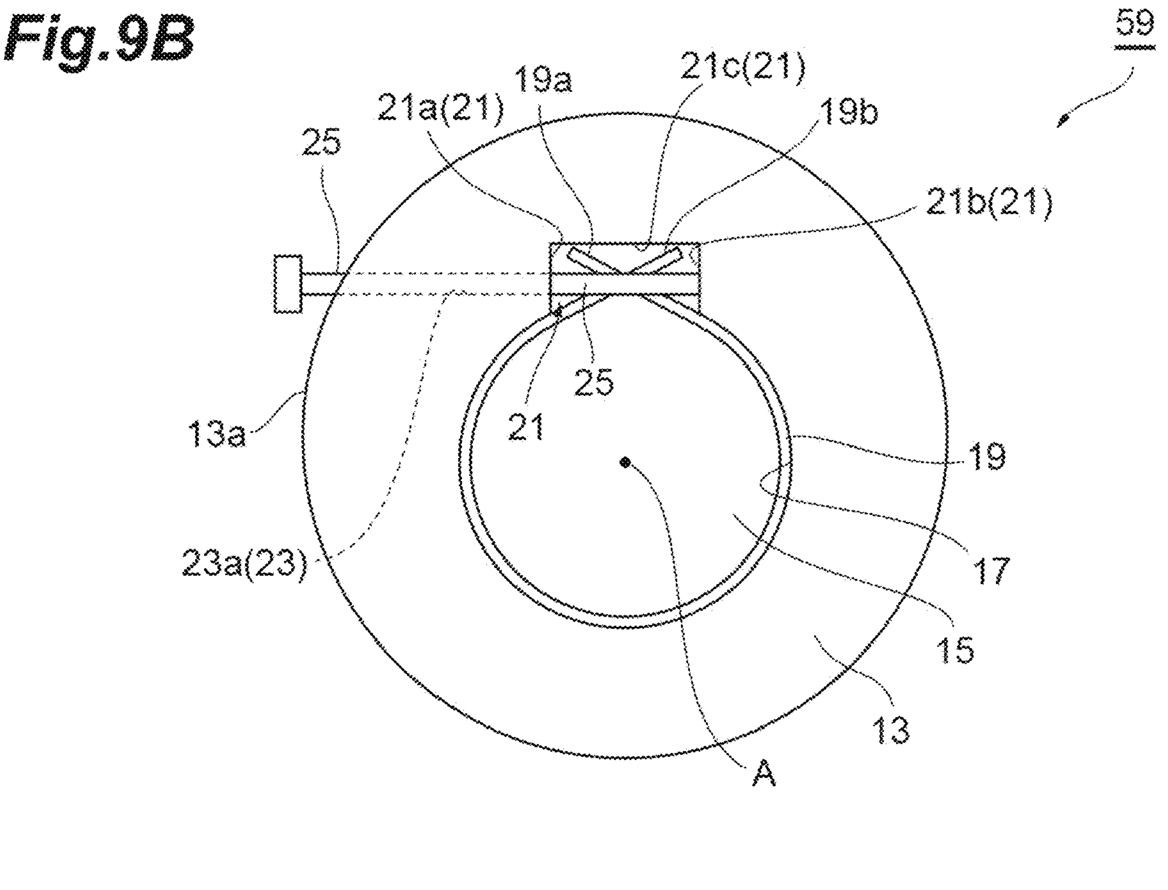
FIG. 9B is a front view illustrating an example radial foil bearing as viewed from the axial direction.

As illustrated in FIG. 9B, in a radial foil bearing 59 according to a ninth embodiment, the pin hole tip side 23_b_ (see FIG. 2A) in the first embodiment is omitted, and the tip of the restricting pin 25 abuts on and is in contact with the groove side surface 21_b_. In this case, in order to fix the restricting pin 25, a female screw portion may be provided on the pin hole base end side 23_a_, and a male screw portion of the restricting pin 25 may be screwed into the female screw portion. In the ninth embodiment, the restricting pin 25 (e.g., a first restricting pin 25) may pass through the groove side surface 21_a_ (e.g., a first groove side surface 21_a_)

and abut the groove side surface 21*b* (e.g., a first groove side surface 21*b*). The restricting pin 25 (e.g., a second restricting pin 25) may pass through the groove side surface 21*b* (e.g., a second groove side surface 21*b*) and abut the groove side surface 21*a* (e.g., a second groove side surface 21*b*).

The present disclosure can be implemented in various forms with various modifications and improvements based on the knowledge of those skilled in the art.

Figure 10A:
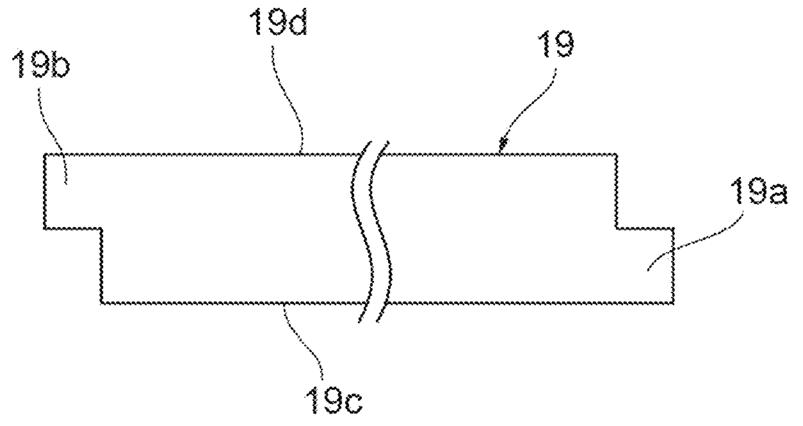
FIG. 10A is a development view illustrating a state where an example bearing foil is developed on a plane.
Figure 10B:
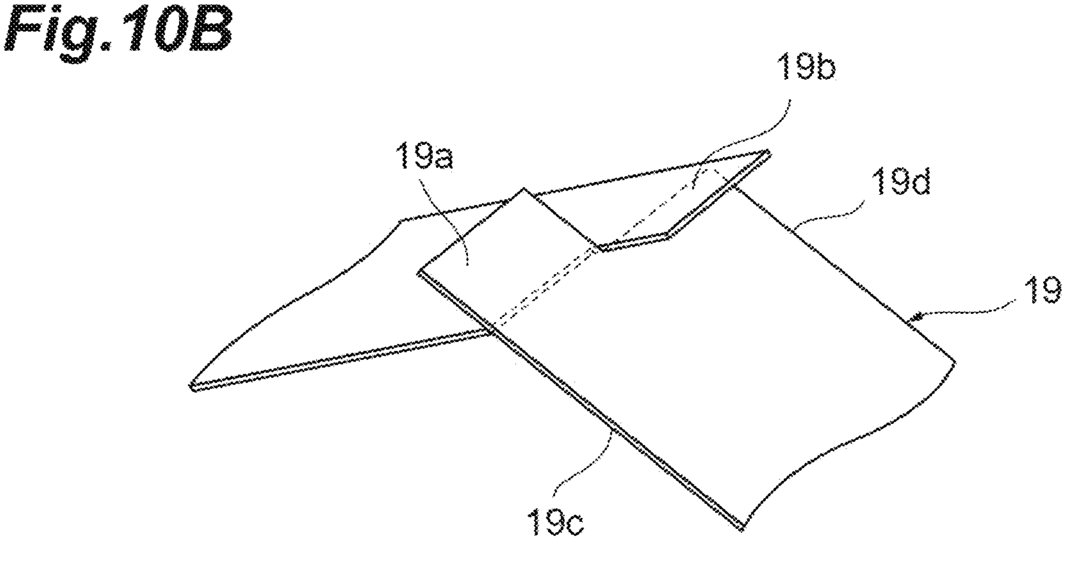
FIG. 10B is a perspective view illustrating both end parts of the bearing foil illustrated in FIG. 10A.

For example, the concave and convex engagement between the end parts 19*a* and 19*b* of the bearing foil 19 is not limited to the structure of FIG. 4B or the like, and various structures may be employed. The bearing foil 19 may have the development shape illustrated in FIG. 10A, and the concave and convex engagement between the end part 19*a* and 19*b* may be of the structure in FIG. 10B. In addition, in each embodiment, the target of the regulation of the axial displacement by the restricting pins 25, 63, and 65 is the bearing foil 19 formed by overlapping three foils (top foil 20*a*, intermediate foil 20*b*, and back foil 20*c*). However, in some examples, at least the top foil 20*a* of the three foils is only required to be the target of the regulation of the axial displacement by the restricting pins 25, 63, and 65. In some examples, the groove 21 may extend to both axial end surfaces of the housing, but the groove 21 may have a bottom on one axial side. One axial side of the groove 21 may not reach the axial end surface of the housing. In this case, one restricting pin 25 may be provided for the groove.

Some additional examples are disclosed as follows, with continued reference to the drawings for convenience of description.

An example radial foil bearing (1, 52, 53, 54, 56, 57, 58, 59) may surround a rotation axis (5) and support the rotation axis (5). The radial foil bearing (1, 52-59) may include a bearing housing (13), an insertion hole (15) formed in the bearing housing (13) and through which the rotation axis (5) is to be inserted, a groove (21) provided in an inner peripheral surface (17) of the insertion hole (15), a through hole (23) including an opening (23*x*) formed in the groove (21) and extending to an outer peripheral surface (13*a*) of the bearing housing (13), a restricting pin (25) inserted into the through hole (23) and extending into the groove (21), and a top foil (20*a*) located in the insertion hole (15). The groove (21) may be formed so as to reach an axial end surface of the bearing housing (13). The top foil (20*a*) may include a circumferential end part (19*a*, 19*b*) located in the groove (21). The restricting pin (25) may pass through or abut an inner side surface (21*a*, 21*b*) of the groove (21).

In the radial foil bearing (1, 52-59), the groove (21) may extend so as to reach both end surfaces (13*c*, 13*d*) in an axial direction (Sd) of the rotation axis (5) of the bearing housing (13).

In the radial foil bearing (1, 52-59), the inner side surface (21*a*, 21*b*) may include a first groove side surface (21*a*), and a second groove side surface (21*b*) facing the first groove side surface (21*a*). The restricting pin (25) may pass through the first groove side surface (21*a*) and the second groove side surface (21*b*).

In the radial foil bearing (1, 52-59), the inner side surface (21*a*, 21*b*) may include a first groove side surface (21*a*), and a second groove side surface (21*b*) facing the first groove side surface (21*a*). The restricting pin (25) may pass through the first groove side surface (21*a*) and abut the second groove side surface (21*b*).

The radial foil bearing (1, 52-59) may include a second restricting pin (25B) that passes through the inner side surface (21*a*, 21*b*). In the radial foil bearing (1, 52-59), the end part (19*a*, 19*b*) of the top foil (20*a*) may be located between the restricting pin (25A) and the second restricting pin (25B) in the axial direction (Sd) of the rotation axis (5).

In the radial foil bearing (1, 52-59), the restricting pin (25) may pass through a hole (19*j*) provided at the end part (19*a*) of the top foil (20*a*) in the groove (21). The top foil (20*a*) may be installed in a state that allows for a displacement corresponding to a dimensional difference between the restricting pin (25) and the hole (19*j*).

In the radial foil bearing (1, 52-59), one end of the restricting pin (25) may be screwed into a female screw hole (23*b*) provided in the inner side surface (21*a*, 21*b*) of the groove (21).

In the radial foil bearing (1, 52-59), the restricting pin (25) may pass through the groove (21) and include two ends that both protrude outside of the bearing housing (13).

In the radial foil bearing (1, 52-59), the two ends of the restricting pin (25) may include retention portions (63*a*, 65*a*, 66) that restrict displacement of the restricting pin (25) from the bearing housing (13).

In the radial foil bearing (1, 52-59), the groove (21) may extend in an axial direction (Sd) of the rotation axis (5). The restricting pin (25) and the end part (19*a*, 19*b*) of the top foil (20*a*) may overlap when viewed in an extending direction of the groove (21).

An example radial foil bearing (1, 52-59) may support a rotation axis (5). The radial foil bearing (1, 52-59) may include a bearing housing (13) having an insertion hole (15) through which the rotation axis (5), a top foil (20*a*) located inside an inner peripheral surface (17) of the insertion hole (15), a groove (21) formed on the inner peripheral surface (17) in which an end part (19*a*, 19*b*) of the top foil (20*a*) is located, a first restricting pin (25A) contacting the end part (19*a*, 19*b*) in the groove (21) to restrict the movement of the top foil (20*a*) in an axial direction (Sd) of the rotation axis (5), and a second restricting pin (25B) contacting the end part (19*a*, 19*b*) in the groove (21) to restrict the movement of the top foil (20*a*) in the axial direction (Sd).

In the radial foil bearing (1, 52-59), the end part (19*a*, 19*b*) of the top foil (20*a*) may be located between the first restricting pin (25A) and the second restricting pin (25B).

In the radial foil bearing (1, 52-59), the end part (19*a*, 19*b*) of the top foil (20*a*) may include a first hole (19*j*) through which the first restricting pin (25A) passes, and a second hole (19*j*) through which the second restricting pin (25B) passes.

In the radial foil bearing (1, 52-59), the end part (19*a*, 19*b*) of the top foil (20*a*) may include a convex end part (19*b*), and a concave end part (19*a*) which engages the convex end part (19*b*).

In the radial foil bearing (1, 52-59), the convex end part (19*b*) and the concave end part (19*a*) are located between the first restricting pin (25A) and the second restricting pin (25B).

In the radial foil bearing (1, 52-59), the inner side surface (21*a*, 21*b*) may include a first groove side surface (21*a*), and a second groove side surface (21*b*) facing the first groove side surface (21*a*). Both of the first restricting pin (25A) and the second restricting pin (25B) may intersect the first groove side surface (21*a*) and the second groove side surface (21*b*).

An example radial foil bearing (1, 52-59) may support a rotation axis (5). The radial foil bearing (1, 52-59) may include a bearing housing (13) including an insertion hole (15) through which the rotation axis (5), a top foil (20*a*) located inside an inner peripheral surface (17) of the insertion hole (15), a groove (21) formed on the inner peripheral surface (17) in which an end part (19*a*, 19*b*) of the top foil (20*a*) is located, a first restricting pin (25A) configured to contact the end part (19*a*, 19*b*) in the groove (21) to restrict a movement of the top foil (20*a*) in an axial direction (Sd) of the rotation axis (5), and a restricting pin (25) configured to contact the end part (19*a*, 19*b*) in the groove (21) to restrict the movement of the top foil (20*a*) in the axial direction (Sd). The inner peripheral surface (21*a*, 21*b*) may include a first groove side surface (21*a*) and a second groove side surface (21*b*) facing the first groove side surface (21*a*). The restricting pin (25) passes through the first groove side surface (21*a*) and the second groove side surface (21*b*).

In the radial foil bearing (1, 52-59), the end part (19*a*, 19*b*) of the top foil (20*a*) may include a convex end part (19*b*) and a concave end part (19*a*) which engages the convex end part (19*b*).

In the radial foil bearing (1, 52-59), the convex end part (19*b*) may include a hole (19*j*) through which the restricting pin (25) passes.

In the radial foil bearing (1, 52-59), the restricting pin (25) may include a bend portion (63*a*) configured to prevent the restricting pin (25) from coming off from the bearing housing (13). The bend portion (63*a*) may be located outside of the bearing housing (13).

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A radial foil bearing configured to support a rotation axis, comprising:
- a bearing housing including an insertion hole through which the rotation axis is to be inserted;
- a top foil located inside an inner peripheral surface of the insertion hole and including two end parts;
- a groove formed on the inner peripheral surface in which the two end parts of the top foil are located;
- a first restricting pin configured to contact a first end part of the two end parts in the groove to restrict a movement of the top foil in an axial direction of the rotation axis; and
- a second restricting pin configured to contact a second end part of the two end parts in the groove to restrict the movement of the top foil in the axial direction,
- wherein the two end parts of the top foil include:
  - a convex end part; and
  - a concave end part which engages the convex end part.

2. The radial foil bearing according to claim 1, wherein at least one of the two end parts of the top foil is located between the first restricting pin and the second restricting pin.

3. The radial foil bearing according to claim 1, wherein the convex end part and the concave end part are located between the first restricting pin and the second restricting pin.

4. The radial foil bearing according to claim 1,
- wherein the groove includes:
  - a first groove side surface; and
  - a second groove side surface facing the first groove side surface, and
- wherein both of the first restricting pin and the second restricting pin pass through the first groove side surface and the second groove side surface.

5. A radial foil bearing configured to support a rotation axis, comprising:
- a bearing housing including an insertion hole through which the rotation axis is to be inserted;
- a top foil located inside an inner peripheral surface of the insertion hole;
- a groove formed on the inner peripheral surface in which an end part of the top foil is located; and
- a restricting pin configured to contact the end part in the groove to restrict a movement of the top foil in an axial direction of the rotation axis,
- wherein the groove includes:
  - a first groove side surface; and
  - a second groove side surface facing the first groove side surface,
- wherein the restricting pin passes through the first groove side surface and the second groove side surface,
- wherein the restricting pin includes a bend portion configured to prevent the restricting pin from coming off from the bearing housing, and
- wherein the bend portion is located outside of the bearing housing.

6. The radial foil bearing according to claim 5, wherein the top foil comprises two end parts located in the groove, including:
- a convex end part; and
- a concave end part which engages the convex end part.

7. The radial foil bearing according to claim 6, wherein the convex end part comprises a hole through which the restricting pin passes.

* * * * *